(12) United States Patent
Kim et al.

(10) Patent No.: US 7,975,300 B2
(45) Date of Patent: Jul. 5, 2011

(54) SECURE ISOLATION AND RECOVERY IN WIRELESS NETWORKS

(75) Inventors: Byungsuk Kim, Edgewater, NJ (US); Farooq Anjum, Somerset, NJ (US); Subir Das, Kendall Park, NJ (US); Praveen Gopalakrishnan, Somerville, NJ (US); Latha Kant, Basking Ridge, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1038 days.

(21) Appl. No.: 11/161,739

(22) Filed: Aug. 15, 2005

(65) Prior Publication Data

US 2006/0236391 A1    Oct. 19, 2006

Related U.S. Application Data

(60) Provisional application No. 60/671,975, filed on Apr. 15, 2005.

(51) Int. Cl.
G06F 12/14 (2006.01)
G06F 11/30 (2006.01)

(52) U.S. Cl. ............... 726/23; 726/22; 726/24; 726/26; 713/151

(58) Field of Classification Search ............ None
See application file for complete search history.

(56) References Cited

U.S. PATENT DOCUMENTS 7,058,796 B2 * 6/2006 Lynn et al. ............ 713/1
7,295,831 B2 * 11/2007 Coleman et al. ............ 455/410
2003/0084321 A1 * 5/2003 Tarquini et al. ............ 713/200
2003/0135762 A1 * 7/2003 Macaulay ............ 713/201
2004/0255167 A1 * 12/2004 Knight ............ 713/201

FOREIGN PATENT DOCUMENTS

| JP | 9-266930 | 10/1997 |
|---|---|---|
| JP | 2003-348113 | 12/2003 |
| JP | 2004-538692 | 12/2004 |
| WO | WO 03/010922 A1 | 2/2003 |
| WO | WO 2004/015966 A1 | 2/2004 |

OTHER PUBLICATIONS

Jpn. Pat. Appln. KOKAI Publication No. 9-269930.
Jpn. Pat. Appln. KOKAI Publication No. 2003-348113.
Jpn. PCT National Publication No. 2004-538692.
Kazumasa Omote, "An Autonomic Security Management System with Prevention and Recovery (1)", vol. 2003, No. 18, IPSJ SIG Notes, Information Processing Society of Japan, Feb. 27, 2003, pp. 101-105.
International Publication No. 2004/015966.
Japanese Office Action dated May 27, 2008.
K. Omote, et al., An Autonomic Security Management System, with Prevention and Recovery (1), Fujitsu Laboratories, Feb. 27, 2003.

* cited by examiner

*Primary Examiner* — Kaveh Abrishamkar
(74) *Attorney, Agent, or Firm* — Westerman, Hattori, Daniels & Adrian, LLP

(57) ABSTRACT

The present invention, among other things, obviates the effects of an attack on a wireless network through appropriate isolation and recovery. An aspect of the present invention can include a system and method of isolating a victim of malicious behavior in a wireless access network, and in particular WLAN networks. By having software on the victim's device, the system provides the capability of recovering the victim from the effects of the intruder, and prevents the victim from being affected by subsequent attacks by the intruder. The preferred embodiments include two key components: a local monitor and a global monitor.

22 Claims, 5 Drawing Sheets

```
WIDS Local Monitor
    22 host 00:05:3c:08:a0:44  2  234  71  2M  No  127  95  1674  0.2k  0.6   2792.67ms  WIDARS-A (00:05:3c:08:a0:44)
    23 host 00:05:3c:08:9b:95  0  206  43  1M  No   2    1   198  0.0k  0.0   76.9574ms  WIDARS-A (00:60:1d:f1:45:f1)
    24 host 00:02:2d:84:5c:b1  0  192  28  2M  No   0    0    10  0.0k  0.0   12206.3ms
    25 host 00:0c:f1:3a:d7:53  0  184  20  1M  No   0    0     2  0.0k  0.0   2.4932ms   AR public wireless LAN
    26 host 00:04:23:5b:03:1e  0  194  30  1M  No   0    0    16  0.0k  0.0   6874.65ms  0db14a
    27 host 00:0c:f1:0a:71:37  0  183  20  1M  No   0    0    13  0.0k  0.0   15904.2ms  AR public wireless LAN TOTAL: 27 hosts  (host: 16 AP : 6  IBSS: 4  N/A: 1 )

*2* new AP [00:05:3c : 08:a0 : 44]: (capability=0x1) (essid=WIDARS - A) (flags = 0x9)

+++ invalid new AP (Rogue AP) detected. (00:05:3c:08: a0:44 -> ff : ff : ff : ff : ff)
+++ reported to the Global Monitor [ 192.168.100.10 ]

*2* deauth [00:60:1d : f1:45:f1 - > 00:05:3c:08:9b:95]: (reason=0x3) (seq=2422) (oldseq=1370)

+++ invalid DEAUTH (Denial of Service) detected. ( 00:60 : 1d : f1:45:f1 - > 00:05:3c:08:9b :95)
  *2* deauth [00:60:1d: f1:45:f1 - > 00:05:3c:08:9b:95]: (reason=0x3) (seq=2422) (oldseq=2422)
  *2* deauth [00:60:1d: f1:45:f1 - > 00:05:3c:08:9b:95]: (reason=0x3) (seq=2422) (oldseq=2422)
+++ reported to the Global Monitor [ 192.168.100.10 ]

*2* assoc_req [00:05:3c:08: 9b:95 - > 00:05:3c:08:a0:44]: (capability=0x0) (essid=WIDARS-A)

+++ invalid ASSOC_RESP (Man in The Middle) detected. (00:50:3c:08:a0:44 - > 00:05:3c:08:9b:95)
  *2* update_stn_info: attack_ibm pthread created (ptid=1605637)
  *2* COUNTER_ATTACK schedule after time    0.00 seconds
  *2* BROADCAST INFO SENT: IM_MESSAGE: LM1 EVENT: MIMATTACK ROUGEAP_MAC 00:05:3c:08:a0:44 Timestamp: 218.08 secs
  *2* COUNTER_ATTACK DONE: RougeAP MAC 00:05:3c:08:a0:44 Timestamp: 218.08 secs +++ invalid COUNTER_ATTACK (Man in The Middle) detected. (00:05:3c:08:a0:44 - > ff:ff:ff:ff:ff:ff)
+++ reported to the Global Monitor [ 192.168.100.10 ]

+++ reported to the Global Monitor [ 192.168.100.10 ]

*2* assoc_req [ 00:05 : 3c : 08: 9b:95 - >00:05:3c:08:a0:44]: (capability=0x0) (essid=WIDARS-A)

+++ invalid ASSOC_RESP (Man in The Middle) detected. ( 00:05:3c: 08:a0:44 - > 00:05:3c:08:9b :95)
  *2* update_stn_info: attack_ibm pthread created (ptid=1654789)
  *2* COUNTER_ATTACK schedule after time    0.00 seconds
  *2* Broadcast INFO SENT: IM_MESSAGE : LM1 EVENT: MIMATTACK ROUGEAP_MAC 00:05:3c:08:a0:44 Timestamp: 219.91 secs
  *2* COUNTER_ATTACK DONE: RougeAP MAC 00:05:3c:08:a0:44 Timestamp: 219.91 secs +++ invalid COUNTER_ATTACK (Man in The Middle) detected. (00:05:3c:08:a0:44 - >ff:ff:ff:ff:ff:ff )
+++ reported to the Global Monitor [ 192.168.100.10 ]
```

FIG. 3

SECURE ISOLATION AND RECOVERY IN WIRELESS NETWORKS

BACKGROUND

1. Field of the Invention

The present application relates to a method of detecting whether or not network entities are being subjected to an attack, and to obviating the effects of an attack, and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that identifies the host device's point of attachment to the IP networks.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, e.g., layers including the network layer or layer-3 in the OSI model and the like) are referred to as the higher-layers.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Network Attacks

In some instances, network entities can be subject to attack and can become victims of malicious behavior. The prior attempts to solve such problem have mainly focused on detecting whether the network entities were being subjected to an attack. The prior solutions had not focused on taking steps to obviate the effects of an attack—i.e., and, thus, do not provide a complete solution to this problem.

BRIEF SUMMARY OF THE INVENTION

The preferred embodiments of the present invention can significantly improve upon existing systems and methods.

It has now been found that a solution to the aforenoted problem is to obviate the effects of an attack through appropriate isolation and recovery. One broad aspect of the present invention is a method to isolate a victim of malicious behavior in a wireless access network, in particular WLAN networks. Additionally, by having software on the victim's device, the system of the present invention provides the capability of recovering the victim from the effects of the intruder, and preventing the victim from being affected by subsequent attacks by the intruder.

Another broad aspect of the invention comprises two key components, a local monitor, and a global monitor. A system for detecting whether entities on a network are being subjected to attack and to obviating the effects of the attack, comprising isolating the entity and recovering the entity from the effects of the attack by intruders.

Another aspect of the invention is the providing of software on entities' devices for recovering entities that have been attacked by an intruder, from the effects of the attack and preventing further attacks by said intruder.

In another aspect of the invention, the local monitor sniffs wireless packets, and/or analyzes layer 2 inconsistencies, and forwards to said global monitor information that is developed from said local monitor sniffing wireless packets and analyzing layer 2 inconsistencies.

In another aspect of the invention the local monitor comprises a wireline interface, a monitoring policy database, detection scripts, a misbehavior database, a traffic sniffer, and an interface to a global monitor.

In another aspect of the invention, local monitors have wire-line connections to the global monitor, whereby the local monitors communicate with a global monitor without subjecting the local monitor to global monitor to wireless connectivity's vulnerability to malicious attacks. The local monitor can cover multiple access points across multiple frequency channels.

In another aspect of the invention local monitors capture packets on a wireless channel, and detects and reports to a global monitor, layer 2 vulnerabilities, and can report to the global monitor attacks based on the attack signatures and policies in effect information to said global monitor.

In another aspect of the invention, a global monitor coordinates and manages a plurality of local monitors. The global monitor can further comprise a wireline interface to a plurality of access points and local monitors, an interface to local monitors, a system information repository, a global inference engine, and a monitoring policy database. The global monitor can reside in a backbone network and is accessible through an access router in a controlled manner, whereby said global monitor is isolated from malicious attacks that might otherwise happen in the wireless part of the network.

In another aspect of the invention a global monitor Interfaces with a plurality of local monitors, analyzes and detects vulnerabilities and/or attacks at layer 3 and beyond, manages local monitors, queries local monitors, and generates appropriate alarms and/or logs. The attacks can include denial of service, rogue access point attacks, man-in-the-middle attacks, and identity theft. Upon detecting an attack, an offending node is isolated the detected attack and a recovery mechanism is provided to prevent future attacks.

In another aspect of the invention software is provided on entities' devices for recovering entities from the effects of the attack and preventing further attacks by the intruder.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 3 is a screen shot showing a local monitor detecting, recovering, and reporting to a global monitor;

DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

It has now been found that a solution to the aforenoted problem is to obviate the effects of an attack through appropriate isolation and recovery. One broad aspect of the present invention is a method to isolate a victim of malicious behavior in a wireless access network, in particular WLAN networks. Additionally, by having software on the victim's device, the system of the present invention provides the capability of recovering the victim from the effects of the intruder, and preventing the victim from being affected by subsequent attacks by the intruder.

The preferred embodiments of the present system include two key components: a local monitor and a global monitor.

We now provide the design details of the local and global monitors, as illustrated in FIGS. (1) and (2), respectively.

Local Monitor:

In the preferred embodiments, the local monitor is responsible for sniffing wireless packets, analyzing layer 2 inconsistencies depending upon the local policies as defined, and forwarding layer 3 transmits information to the global monitor.

Figure 1:
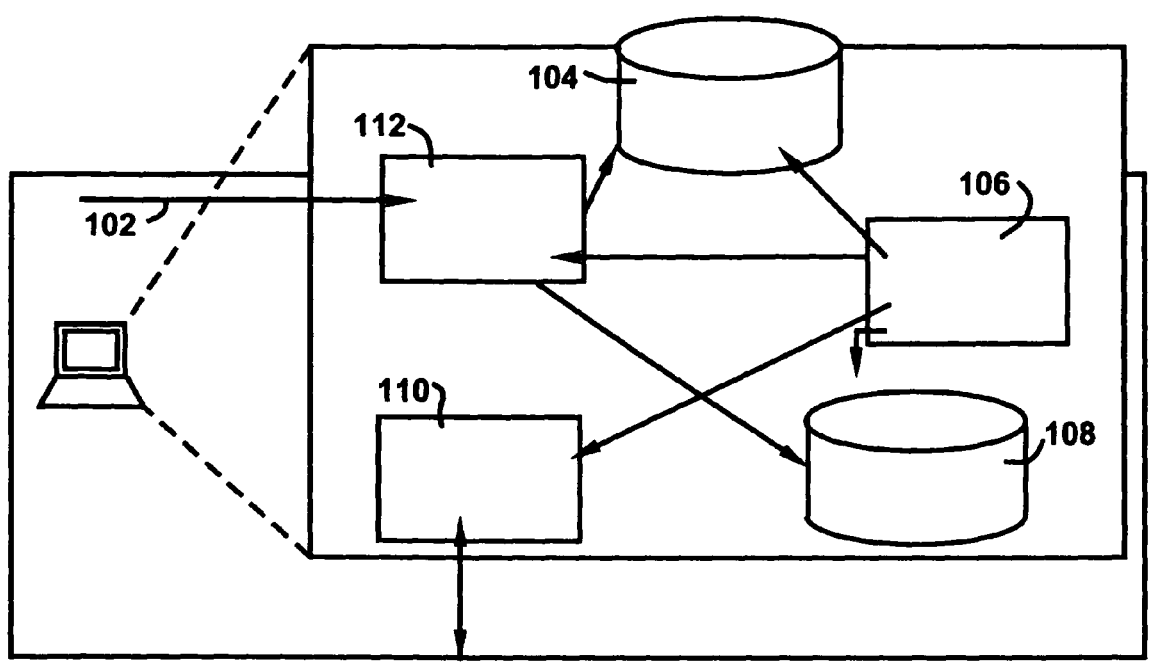
FIG. 1 is a schematic representation of a local monitor.

The schematic illustration of FIG. 1 shows a wireline interface 102, a monitoring policy database 104, detection scripts 106, misbehavior database 108, sniffed traffic 110, and an interface to global monitor 112.

Since all traffic is transit through the Access Point (AP) in infrastructure mode, close proximity to the AP becomes a logical choice to place the local monitor. It is required that the local monitors have wire-line connections 102, to the backbone network to communicate with the global monitor, since wireless connectivity is again vulnerable to malicious attacks. The local monitors may or may not be in the same subnet as the deployed wireless LAN. Note that a single local monitor component need not be restricted to just a single AP but in fact can cover multiple APs across multiple frequency channels. In the case of 802.11 WLAN, a local monitor in a promiscuous mode can capture all the air traffic from multiple hosts and APs within the coverage area regardless of their logical network configuration (e.g., in 802.11 through ESSID and WEP configuration). The most commonly used PHY layer standard in 802.11 is DSSS (Direct Sequence Spread Spectrum). With this technology, most of the channel energy is spread across a 22 MHz band while the channel spacing is 5 MHz. Therefore, In order to prevent interference with adjacent channels, 5 or more channel separation (5×5 MHz 25 MHz) is required. Conversely, within 4-channel separation, it is possible to receive signals from the adjacent channels. Thus, the local monitor can also observe other channels that are separated by four channels. However, since the signal from other channels may appear weaker to the local monitor depending on the propagation environment, it is preferable to put local monitor for each frequency channel used. In this way the physical layer dependencies can be avoided and the local monitor will be able to sniff 110 and analyze (104, 106, and 108) the misbehavior traffic quickly and efficiently and report to the global monitor accordingly.

In the preferred embodiments, the local monitor is designed with the following functionalities:

1. Capturing of packets on the wireless channel;
2. Detecting and reporting any layer 2 vulnerabilities/attacks based on the attack signatures and policies in effect;
3. Reporting layer 3 traffic information to global monitor;
4. Generating alarms/logs as appropriate.
5. Communicating with user agent software on the entities' devices to provide information on the attacks and to initiate the recovery process.

Figure 2:
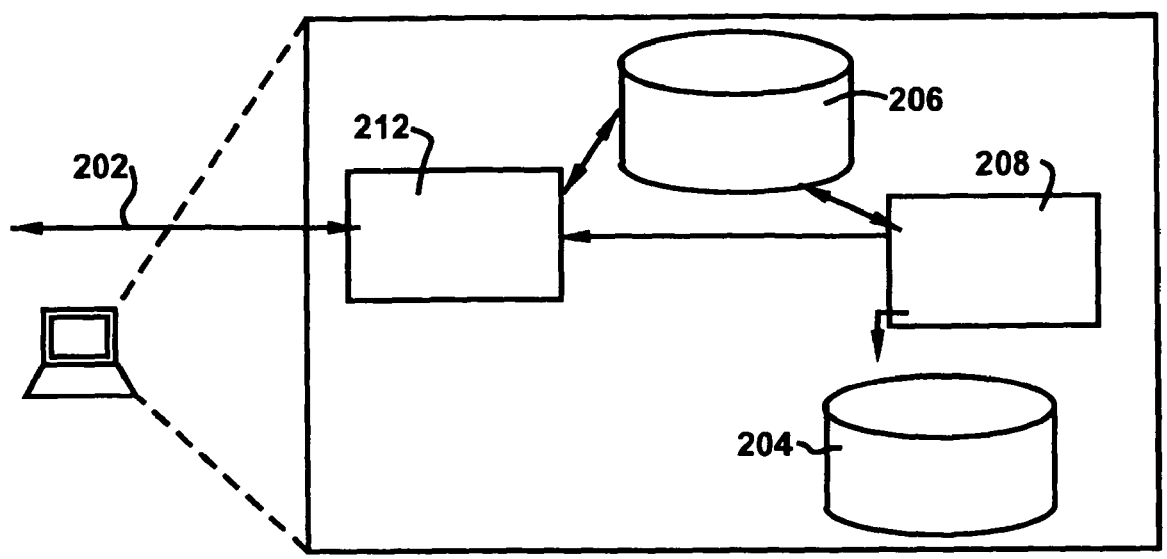
FIG. 2 is a schematic representation of a global monitor.

Global Monitor:

In the preferred embodiments, the global monitor shown in FIG. 2 is mainly responsible for coordinating and managing multiple local monitors. In addition, the global monitor is responsible for determining any inconsistencies above layer 2 as defined in the policy database.

The global monitor preferably comprises a wireline interface 202 to the various APs and local monitors, an interface 212 to local monitor, a system information repository 206, a global inference engine 208, and a monitoring policy database 204. The global monitor resides in the backbone network, and is accessible through the access router in a controlled manner to isolate it from malicious attacks that may otherwise happen in the wireless part of the network. For robustness and scalability purposes, the global monitor may also be distributed. The local monitors and various APs are connected to the global monitors via a wireline interface 202. This not only reduces wireless DOS attacks on the global monitor significantly, but also diminishes the risk of breaking the connection between the local and global monitor. In some preferred embodiments, some key functions of the global monitor include:

1. Interfacing with the various local monitors;
2. Analyzing and detecting any vulnerabilities/attacks at layer 3 and beyond;
3. Managing the various local monitors;
4. Query local monitors whenever necessary;
5. Generate appropriate alarms/togs.

Armed with the above, the design of the preferred embodiments of the present invention is instrumental in detecting various attacks such as (a) Denial of Service (DOS) attacks, (b) Rogue AP attacks (where an attacker can configure itself to be a, fake (rogue) AR and masquerade around), and/or (c) Man-in-the-middle type of attacks and (L2) identity theft. Once detected, the design of the preferred embodiments of the present invention first isolates the offending node(s) from attacks and then provides recovery mechanisms to prevent future attacks.

The existing systems had focused on detection essentially only in terms of functionality. On the other hand, the preferred embodiments of the present invention focus on isolation and recovery Detection of malicious behavior or attacks and the recovery approach of the preferred embodiments of the present invention are two different things. The isolation and recovery system of the preferred embodiments is not obvious and straightforward in wireless access networks, even for one having sophisticated detection techniques.

Figure 4:
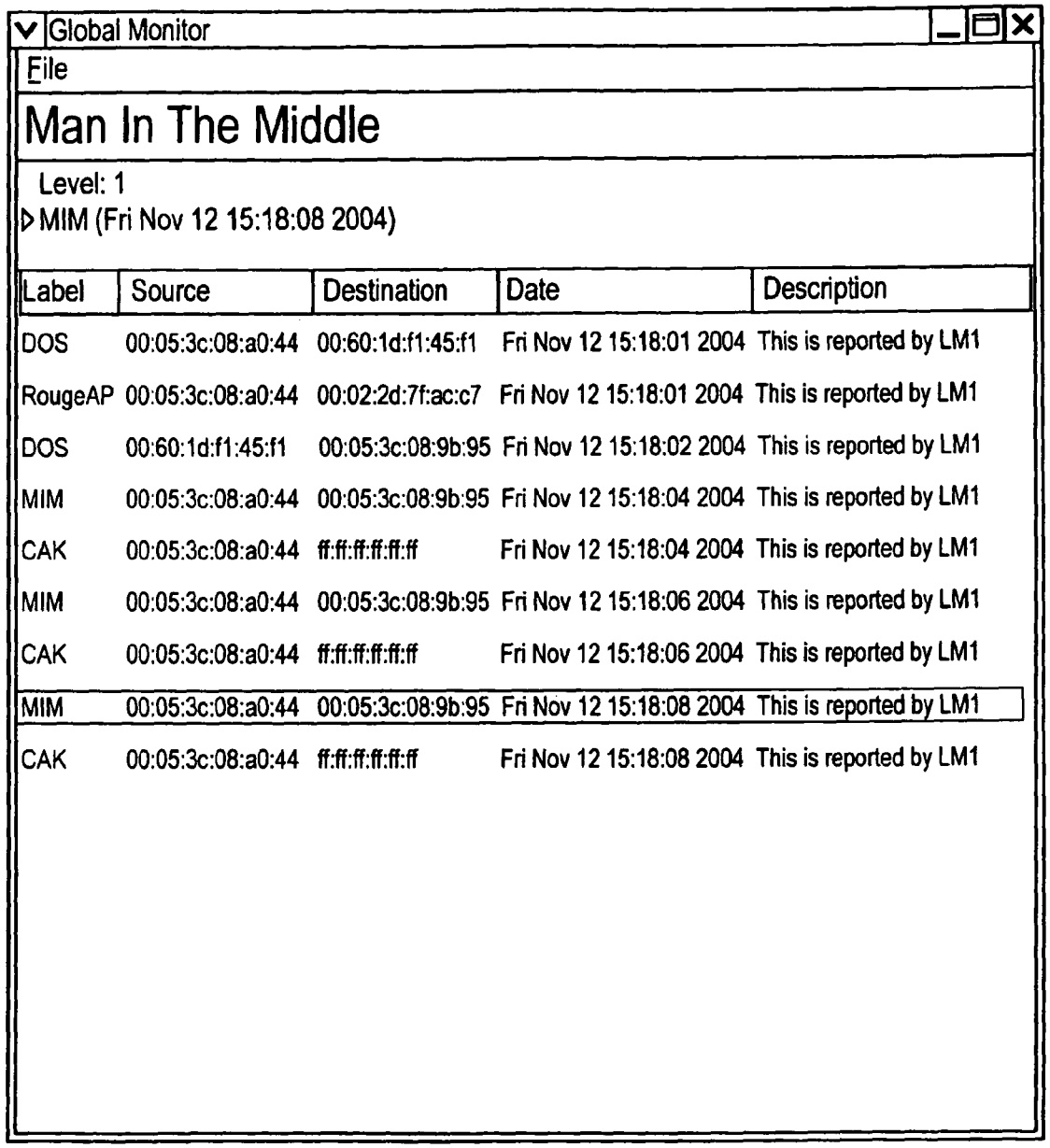
FIG. 4 is a screen shot of a global monitor showing the activities reported by the local monitor.
Figure 5:
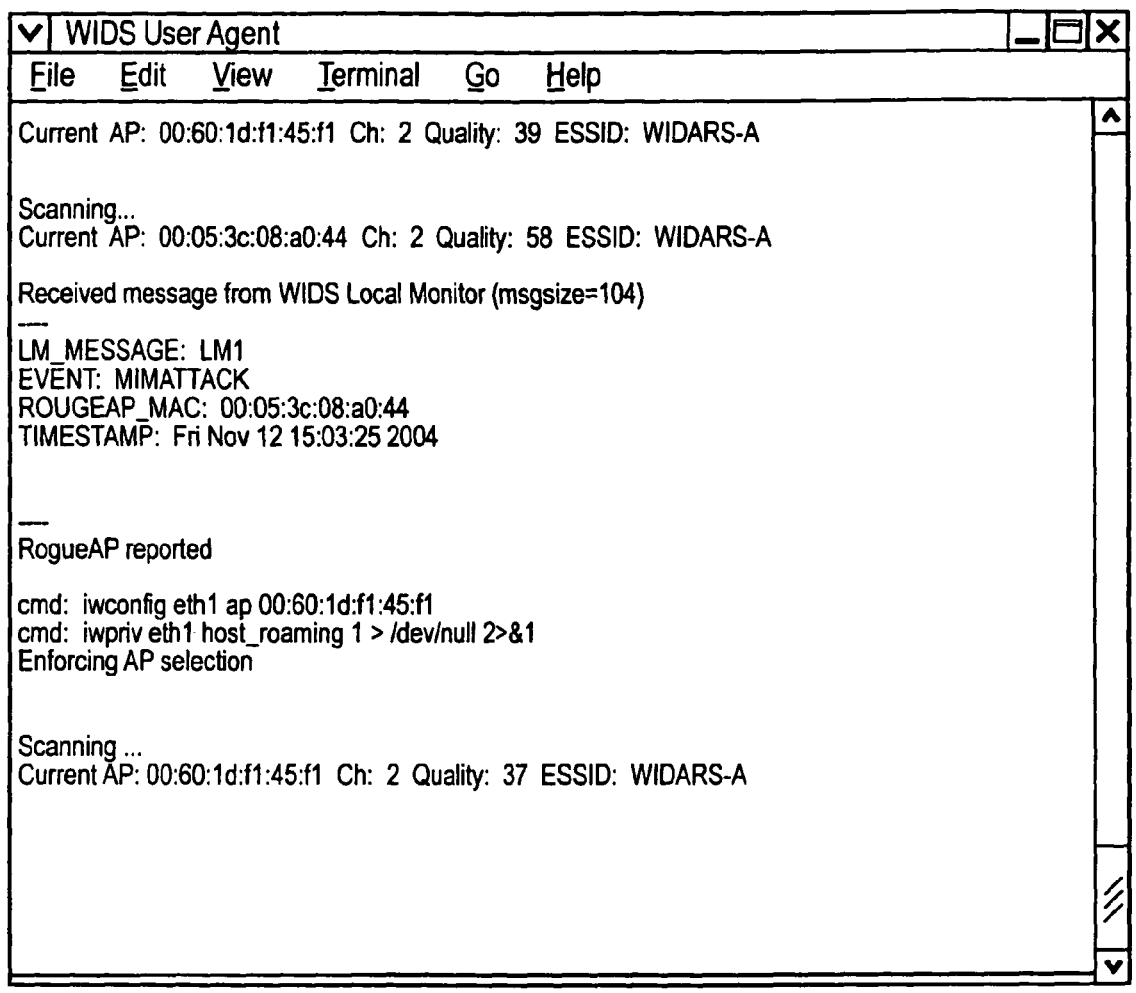
FIG. 5 is a screen shot of a user agent performing the recovery triggered by the local monitor.

An illustrative implementation of an embodiment of the present invention is demonstrated in the screen shots of FIGS. 3, 4 and 5. FIG. 3 shows a successful local monitor detecting, recovering, and reporting to the global monitor. FIG. 4 shows a global monitor successfully showing the activities reported to the global monitor by the local monitor. FIG. 5 shows a user agent successfully performing the recovery triggered by the local monitor.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

What is claimed is:

1. A method of detecting whether network entities in a wireless local area network, having at least one access point accessed by at least one wireless mobile device, are being subjected to attack by an intruder device and of obviating the effects of the attack, comprising:
    isolating the entity and recovering the entity from the effects of the attack by intruders using a local monitor proximate the access point that sniffs wireless packets and transmits information via a wireline connection to a global monitor residing within the network that manages multiple local monitors;
    providing software on said wireless mobile devices for recovering said mobile devices from the effects of an attack by an intruder;
    wherein said providing software on said mobile devices for recovering network entities from the effects of an attack by an intruder includes providing user agent software on potential victims' said mobile-devices that access said wireless local area network via said access point to recover said mobile devices from malicious attacks by said intruder device, and preventing further attacks by said intruder device, said user agent software on said mobile devices causing said user mobile devices to avoid said intruder based on an alert communication from said local monitor.

2. The method of claim 1, wherein said user agent software is configured to cause said mobile device to enforce new access point selection to another access point within said network.

3. The method of claim 2, wherein said local monitor sniffs wireless packets, and analyzes layer 2 inconsistencies, and forwards to said global monitor information that is developed from said local monitor sniffing wireless packets and analyzing layer 2 inconsistencies.

4. The method of claim 3, wherein said local monitor processes information in a monitoring policy database, detection scripts, a misbehavior database, and a traffic sniffer, and communicates said information to a global monitor via said wireline interface.

5. The method of claim 3, wherein said local monitor is in close proximity to said access point.

6. The method of claim 2, wherein a plurality of said local monitors capture packets on a wireless channel, detect vulnerabilities based on attack signatures and policies, and report said vulnerabilities and traffic information to the global monitor.

7. The method of claim 4, wherein at least one local monitor covers multiple access points across multiple frequency channels.

8. The method of claim 3, wherein said local monitor captures packets on a wireless channel, detects and reports layer 2 vulnerabilities.

9. The method of claim 3, wherein said local monitor reports to said global monitor attacks based on the attack signatures and policies in effect.

10. The method of claim 3, wherein said local monitor reports layer 3 traffic information to said global monitor.

11. The method of claim 3, wherein said local monitor generates attack alarms and/or logs.

12. The method of claim 3, wherein said local monitor communicates with said user agent software on the mobile devices to provide information on the attacks and to initiate the recovery process.

13. The method of claim 3, wherein said global monitor coordinates and manages a plurality of local monitors.

14. The method of claim 13, wherein said global monitor processes information in a system information repository, a global inference engine, and a monitoring policy database and communicates processed information via a wireline interface to a plurality of access points and local monitors.

15. A method of detecting whether entities on a wireless access network, in which mobile devices access the access network via a plurality of access points, are being subjected to attack and of obviating the effects of the attack, comprising:
    isolating the entity and recovering the entity from the effects of the attack by intruders using a local monitor and a global monitor,
    wherein said global monitor coordinates and manages a plurality of local monitors, and wherein said global monitor resides in a backbone network and is accessible in a controlled manner, whereby said global monitor is isolated from malicious attacks that can happen in the wireless part of the network;
    further comprising processing software on entities' devices for recovering entities the effects of the attack by an intruder and preventing further attacks by said intruder, including user agent software on potential victim said mobile devices that is configured to cause said mobile devices to avoid said intruder by enforcing new access point selection in response to a transmission from said local monitor.

16. The method of claim 3, wherein said local monitor captures packets on a wireless channel, sniffs said wireless packets, and analyzes layer 2 inconsistencies, and forwards to said global monitor information that is developed from said local monitor sniffing wireless packets and analyzing layer 2 inconsistencies, said local monitor processing packet information in a monitoring policy database, detection scripts, a misbehavior database, and a traffic sniffer, reporting said information via a wireline interface to a global monitor, at least one local monitor covering multiple access points across multiple frequency channels, said local monitor and detecting and reporting to said global monitor layer 2 vulnerabilities, layer 3 traffic information, and attacks based on the attack signatures and policies in effect and generating attack alarms and/or logs.

17. The method of claim 16, wherein said global monitor has a system information repository, a global inference engine, and a monitoring policy database, said global monitor interfacing with a plurality of local monitors, coordinates and manages a plurality of local monitors via a wireline interface to a plurality of access points and local monitors, said global monitor residing in a backbone network and being accessible through an access router in a controlled manner, whereby said global monitor is isolated from malicious attacks that can happen in the wireless part of the network, said global monitor analyzing and detecting vulnerabilities and/or attacks at layer 3 and beyond, querying local monitors, and generates appropriate alarms and/or logs, wherein said attacks comprises at least one of denial of service, rogue access point attacks, man-in-the-middle attacks and identity theft, and upon detecting an attack, isolating an offending node from the detected attack and providing a recovery mechanisms to prevent future attacks.

18. The method of claim 1, further including detecting attacks at layer 3 or higher by said intruder device.

19. A method of detecting whether entities on a wireless access network, having at least one access point accessed by at least one wireless mobile device, are being subjected to attack and of obviating the effects of the attack, comprising:
    isolating the entity and recovering the entity from the effects of the attack by intruders using a local monitor and a global monitor,
    wherein said global monitor coordinates and manages a plurality of local monitors, and wherein said global monitor resides in a backbone network and is accessible in a controlled manner, whereby said global monitor is isolated from malicious attacks that can happen in the wireless part of the network;
    wherein said global monitor interfaces with a plurality of local monitors, analyzes and detects vulnerabilities and attacks at layer 3 and beyond, manages local monitors, queries local monitors, and generates alarms and logs;
    wherein said local monitor is configured to transmit a message to a wireless mobile device causing said wireless mobile device to avoid an intruder; and
    further including providing an user agent on said mobile device configured to recover said mobile device from malicious attacks by said intruders, said user agent on said mobile device being configured to cause said user mobile device to avoid said intruder based on said message transmitted from said local monitor.

20. A method of detecting whether entities on a network are being subjected to attack and of obviating the effects of the attack, comprising:
    isolating the entity and recovering the entity from the effects of the attack by intruders using a local monitor proximate an access point that sniffs wireless packets;
    providing software on entities' devices for recovering entities from the effects of an attack by an intruder;
    further including triggering said recovery by said local monitor reporting to a potential victim user device of the attack by said intruder;
    said recovery including user agent software on said potential victim user device configured to cause said user device to avoid said intruder;
    said recovery including said user agent software causing said user device to enforce new access point selection.

21. A system for detecting whether entities within wireless access networks are being subjected to attack and of obviating the effects of attack, comprising:
    a) a global monitor located within a backbone network and a plurality of local monitors located in proximity to access points in wireless access networks, said global monitor being configured to manage via wireline connections said plurality of local monitors in a manner to isolate an offending node in a wireless access network under attack;

b) said local monitors being configured to isolate an entity and recover the entity from the effects of attacks by intruders; and c) an user agent on a mobile user device connected to said access network under attack configured to recover the mobile user device from attack in response to a trigger from one of said local monitors, said user agent being configured to cause said user device to enforce new access point selection.

22. The system of claim 21, wherein said wireless access network include a plurality of WLAN networks.

* * * * *